United States Patent
Drori

(10) Patent No.: US 11,866,680 B2
(45) Date of Patent: Jan. 9, 2024

(54) APPARATUS AND METHOD FOR AGING WINE

(71) Applicant: Ariel Scientific Innovations Ltd., Ariel (IL)

(72) Inventor: Elyashiv Drori, Shilo (IL)

(73) Assignee: Ariel Scientific Innovations Ltd., Ariel (IL)

( * ) Notice: Subject to any disclaimer, the term of this patent is extended or adjusted under 35 U.S.C. 154(b) by 0 days.

(21) Appl. No.: 16/076,010

(22) PCT Filed: Feb. 9, 2017

(86) PCT No.: PCT/IL2017/050162
§ 371 (c)(1),
(2) Date: Aug. 7, 2018

(87) PCT Pub. No.: WO2017/137991
PCT Pub. Date: Aug. 17, 2017

(65) Prior Publication Data
US 2019/0177675 A1     Jun. 13, 2019

Related U.S. Application Data

(60) Provisional application No. 62/292,927, filed on Feb. 9, 2016.

(51) Int. Cl.
| | | |
|---|---|---|
| *C12H 1/14* | (2006.01) | |
| *C12H 1/02* | (2006.01) | |
| *C12G 3/07* | (2006.01) | |
| *C12H 1/22* | (2006.01) | |

(52) U.S. Cl.
CPC .............. *C12H 1/14* (2013.01); *C12G 3/07* (2019.02); *C12H 1/02* (2013.01); *C12H 1/22* (2013.01)

(58) Field of Classification Search
CPC .............. C12G 3/07; C12G 3/08; C12H 1/22
See application file for complete search history.

(56) References Cited

U.S. PATENT DOCUMENTS

| | | |
|---|---|---|
| 2,017,235 A | 10/1935 | Drew |
| 2,114,009 A * | 4/1938 | Ramsay ................. C12G 3/07 99/277.1 |
| 3,119,321 A | 1/1964 | Deal et al. |
| 4,073,955 A | 2/1978 | Koppelman |
| (Continued) | | |

FOREIGN PATENT DOCUMENTS

| | | |
|---|---|---|
| CN | 2228487 | 6/1996 |
| CN | 101227008 | 7/2008 |
| (Continued) | | |

OTHER PUBLICATIONS

English Translation of FR 2712300 (Year: 1995).*

(Continued)

*Primary Examiner* — Katherine D Leblanc

(57) ABSTRACT

System for maturation of wine comprises a tank and one or more wooden barrels and flow connectors to allow circulation of maturing wine between the tank and the one or more barrels. The barrels may comprise a wooden exterior and an internal volume and a plurality of internal wooden surfaces extending inwardly of the wooden exterior into the internal volume to increase wood surface area. The barrel may be a traditional oak barrel.

11 Claims, 4 Drawing Sheets

(56) References Cited

U.S. PATENT DOCUMENTS

| | | | | |
|---|---|---|---|---|
| 4,558,639 | A | * | 12/1985 | Hojnoski ............... C12G 3/07 99/277.1 |
| 5,906,151 | A | | 5/1999 | Firestone et al. |
| 6,043,075 | A | | 5/2000 | Bjornvad et al. |
| 7,357,069 | B1 | * | 4/2008 | Karasch ............... C12G 3/07 99/277.1 |
| 2003/0008036 | A1 | | 1/2003 | Huige et al. |
| 2003/0035856 | A1 | | 2/2003 | Vickers, Sr. |
| 2008/0107785 | A1 | | 5/2008 | Roodman et al. |
| 2009/0000487 | A1 | | 1/2009 | Guiseppe |

FOREIGN PATENT DOCUMENTS

| | | |
|---|---|---|
| CN | 102827726 | 12/2012 |
| CN | 202595124 | 12/2012 |
| CN | 203318841 | 12/2013 |
| CN | 103865744 | 6/2014 |
| CN | 203768346 | 8/2014 |
| FR | 2504498 | 10/1982 |
| FR | 2712300 | 5/1995 |
| GB | 427231 | 4/1935 |
| GB | 500081 | 2/1939 |
| SU | 379619 | 4/1973 |
| SU | 1035058 | 8/1983 |
| WO | WO 95/00401 | 1/1995 |
| WO | WO 2017/137991 | 8/2017 |

OTHER PUBLICATIONS

International Preliminary Report on Patentability dated May 28, 2018 From the International Preliminary Examining Authority Re. Application No. PCT/IL2017/050162. (9 Pages).
International Search Report and the Written Opinion dated May 4, 2017 From the International Searching Authority Re. Application No. PCT/IL2017/050162. (9 Pages).
Request of Preliminary Observations dated Sep. 26, 2018 From the Instituto Nacional de Propiedad Industrial, INAPI, Ministerio de Economia, Fomento y Turismo, Gobierno de Chile Re. Application No. 2018-01749 and Its Translation Into English. (2 Pages).
Examination and Search Report dated Jul. 15, 2019 From the Instituto Nacional de Propiedad Industrial, INAPI, Ministerio de Economia, Fomento y Turismo, Gobierno de Chile Re. Application No. 2018-001749 and Its Translation Into English. (11 Pages).
Invitation Pursuant to Rule 62a(1) EPC dated Nov. 7, 2019 From the European Patent Office Re. Application No. 17749981.1. (3 Pages).
Examination Report dated Jul. 3, 2020 From the Australian Government, IP Australia Re. Application No. 2017218791. (4 Pages).
Notification of Office Action and Search Report dated Sep. 14, 2020 From the State Intellectual Property Office of the People's Republic of China Re. Application No. 202020155379.4. (5 Pages).
Supplementary European Search Report and the European Search Opinion dated Mar. 12, 2020 From the European Patent Office Re. Application No. 17749981.1. (7 Pages).
Notification of Office Action and Search Report dated Jul. 5, 2021 From the State Intellectual Property Office of the People's Republic of China Re. Application No. 201780007567.3 and Its Translation of Office Action Into English. (35 Pages).
Guo Yongliang et al. "Application of Oak Products in Wine Aging", Sino-Overseas Grapvine and Wine:54-60, Dec. 31, 2009 with English Conclusion.
Lustrato et al. "Inactivation of Dekkera Bruxellensis Yeasts in Wine Storage in Brand New Oak Barrels Using Low Electric Current Technology", Annals of Microbiology, 65:2091-2098, Feb. 19, 2015.
Notification of Office Action dated Oct. 9, 2021 From the State Intellectual Property Office of the People's Republic of China Re. Application No. 202120468808.8 and Its English Summary. (7 Pages).
Communication Pursuant to Article 94(3) EPC dated Mar. 25, 2022 From the European Patent Office Re. Application No. 17749981.1. (4 Pages).
Notification of Office Action and Search Report dated Feb. 24, 2022 From the State Intellectual Property Office of the People's Republic of China Re. Application No. 201780007567.3 and Its Translation of Office Action Into English. (5 Pages).
Xu "Filling 450ml BottledBbeer with 640ml Filling 1Lne,",Beer Technology: 39-40, May 15, 1995. (Chinese only).
Yang et al. "Treatment of Winery Wastewater by Using Two—Stage Soft—Hard Double Bed AF Process and Aerobic Baffling Ditch", Journal of Yunnan University of Nationalities (Natural Sciences) 21( 5): 330-333, 2012. (Chinese Document with English Abstract.
Notification of Office Action and Search Report dated Aug. 22, 2022 From the State Intellectual Property Office of the People's Republic of China Re. Application No. 201780007567.3 and Its Translation of in English. (21 Pages).

* cited by examiner

… (1)

APPARATUS AND METHOD FOR AGING WINE

RELATED APPLICATIONS

This application is a National Phase of PCT Patent Application No. PCT/IL2017/050162 having International filing date of Feb. 9, 2017, which claims the benefit of priority under 35 USC § 119(e) of U.S. Provisional Patent Application No. 62/292,927 filed on Feb. 9, 2016. The contents of the above applications are all incorporated by reference as if fully set forth herein in their entirety.

FIELD AND BACKGROUND OF THE INVENTION

The present invention, in some embodiments thereof, relates to apparatus and a method for aging wine.

Today, quality red and white wines are usually aged in 225-500 liter oak barrels. The barrels are very expensive and are effective for up to 4 years. As oak becomes scarce and ever stricter environmental regulations dictate the number of trees that are cut each year, the price rises.

Wine has been aged in oak barrels for centuries. There are historical reasons for the popularity of the oak barrel, which include their shape, which enables rolling, and the assistance of the oak to control the wine aging process as it facilitates micro-oxidation through the trachea in the wood. Microoxidation enables enough oxygen for positive chemical reactions, but insufficient oxygen for the damaging ones. In addition, the flavors concentrated in the toasted oak, when coming in contact with the wine, are released into the wine and enrich its aroma profile and mouth feeling. The polyphenols in the oak are a very important factor, adding to mouthfeel and act as a natural preservant and color enhancer, enhancing the aging potential of the wine.

Nevertheless, the traditional barrel has its faults, as it is very expensive, its shape is awkward for stacking and wastes considerable space in the winery. In addition, cleaning of wine barrels is very problematic, as the barrel is a closed vessel with a very narrow opening (50 mm). Thus, every few month the barrels are emptied, cleaned by hot water or steam and refilled. This operation causes wine oxidation, wine loss and requires extensive man power.

Because of these faults, it is common in modern wineries to age wines in stainless steel tanks. When this practice is used, it is customary to add oak wood cheeps or staves for the purposes of providing taste and aroma, and in advanced wineries a micro oxidation system is often installed. Those practices try to imitate the natural processes happening in the barrel. Unfortunately, the results are usually insufficient, and reduce the prestige of the resulting wine, causing the wineries to sell those wines under lower level labels.

SUMMARY OF THE INVENTION

The present embodiments describe a wine aging system which may combine the large and cheap aging volume of stainless steel and the benefits of oak aging, in particular the imparting of flavor and micro oxidation.

According to an aspect of some embodiments of the present invention there is provided a system for maturation of wine comprising a tank and one or more wooden barrel and flow connectors to allow circulation of maturing wine between the tank and the barrel. The bulk of the wine at any given time is in the tank, but the wine circulates and thus spends maturation time in the barrel.

In an embodiment, the tank is a steel tank, and the wooden barrel may have internal wooden surfaces extending into the volume of the barrel to increase the surface area of the wood, so that even though the wine spends less time in the barrel, it actually spends more time in close proximity to a wooden surface.

In an embodiment, the internal wooden surfaces form compartments, and openings may be provided between the compartments to allow flow of the maturing wine through the barrel.

In an embodiment, the volume of the at least one barrel is less than a fifth of the volume of the tank.

In an embodiment, the barrel is at a lower level than a top of the tank to allow gravity to assist the circulation.

In an embodiment, the flow connectors comprise a pump to assist the circulation.

A plurality of barrels may be connected in series with each other and with the tank. Alternatively, a plurality of barrels may be connected in parallel with each other and in series with the tank.

According to a second aspect of the present invention there is provided a barrel for maturation of wine comprising a wooden exterior and an internal volume and a plurality of internal wooden surfaces extending inwardly of the wooden exterior into the internal volume to ensure that there is a large surface area of the wood in contact with the maturing wine.

In an embodiment, the internal wooden surfaces divide the barrel into compartments, the internal wooden surfaces having openings to allow for flow of maturing wine between the compartments.

The barrel may comprise oak.

The barrel is typically placed on its side, and the compartments and the openings forming a flow path between an intake at one end of the barrel and an outlet at an opposite end of the barrel.

In an embodiment, each compartment has an inlet at one end and an outlet at an opposite end such that the flow path extends along a length of each compartment.

In an embodiment, the inlet is higher than the outlet, thereby to allow gravity to assist with flow of the maturing wine through the flow path.

According to a third aspect of the present invention there is provided a method of maturing wine comprising circulating maturing wine between at least one wooden barrel and a tank.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
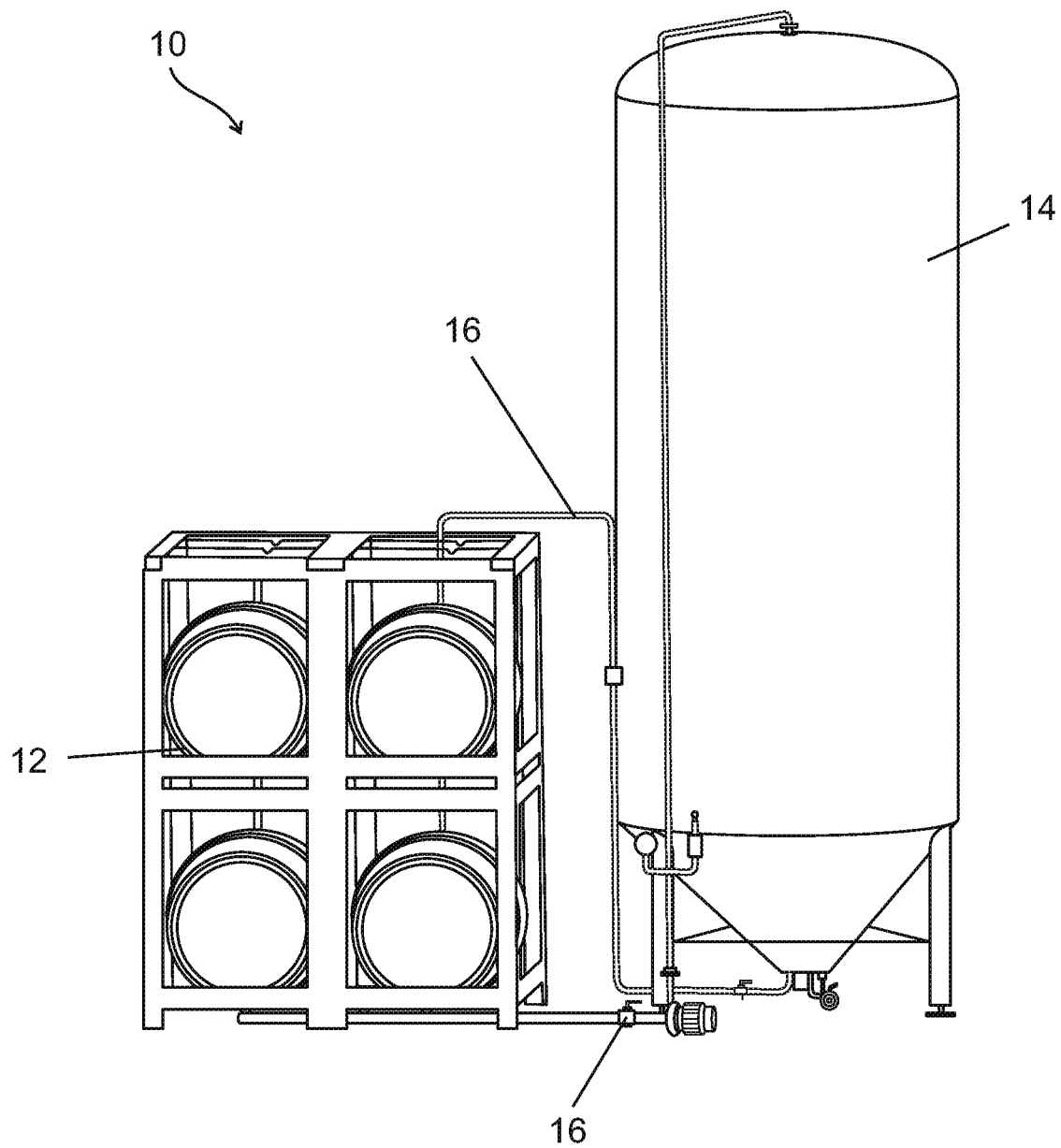
FIG. 1 is a simplified schematic diagram showing a system for maturation of wine according to a first embodiment of the present invention.

The present invention, in some embodiments thereof, relates to a method and apparatus for aging wine.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which illustrates a winery aging system 10 which comprises a combination of a barrel arrangement 12 and a stainless steel tank 14, using the advantages of both systems for a shorter and cheaper wine aging process, saving money and space without giving up quality. Flow connectors 16 allow circulation of maturing wine between the tank and the barrel arrangement.

The volume of barrel or arrangement of barrels is less than a fifth of the volume of the tank, and may typically be around 15%. Thus less barrel is used per volume of wine but, as will be discussed below, the barrel has internal surfaces so that the wine spends more time in close proximity to a wooden surface. The barrel arrangement is at a lower level than a top of the tank and thus allows gravity to assist with circulation of the wine between the barrels and the tank. The flow connectors may additionally comprise a pump to assist with the circulation.

The barrel arrangement may be several barrels connected to form a flow path with the tank. The barrels may be connected in series between themselves and with the tank, or the barrels may be connected in parallel among themselves but in series with the tank. Alternatively two or more parallel paths may be connected, each having two or more barrels.
The Barrel of the Present Embodiments and its Advantages:

Regular barrels are oval shaped, and hollow. The exchange of oxygen and flavors takes place in a very small fraction of overall volume of the barrel, specifically at the places where the wine and wood meet. As a result, the aging process is slow and inefficient, as the oxygen diffuses into the wine according to a concentration cascade. Furthermore, when the wine close to the surface is saturated, the micro oxidation process practically stops. The same phenomenon happens with the aroma extraction process from the barrel into the aging wine.

Figure 2:
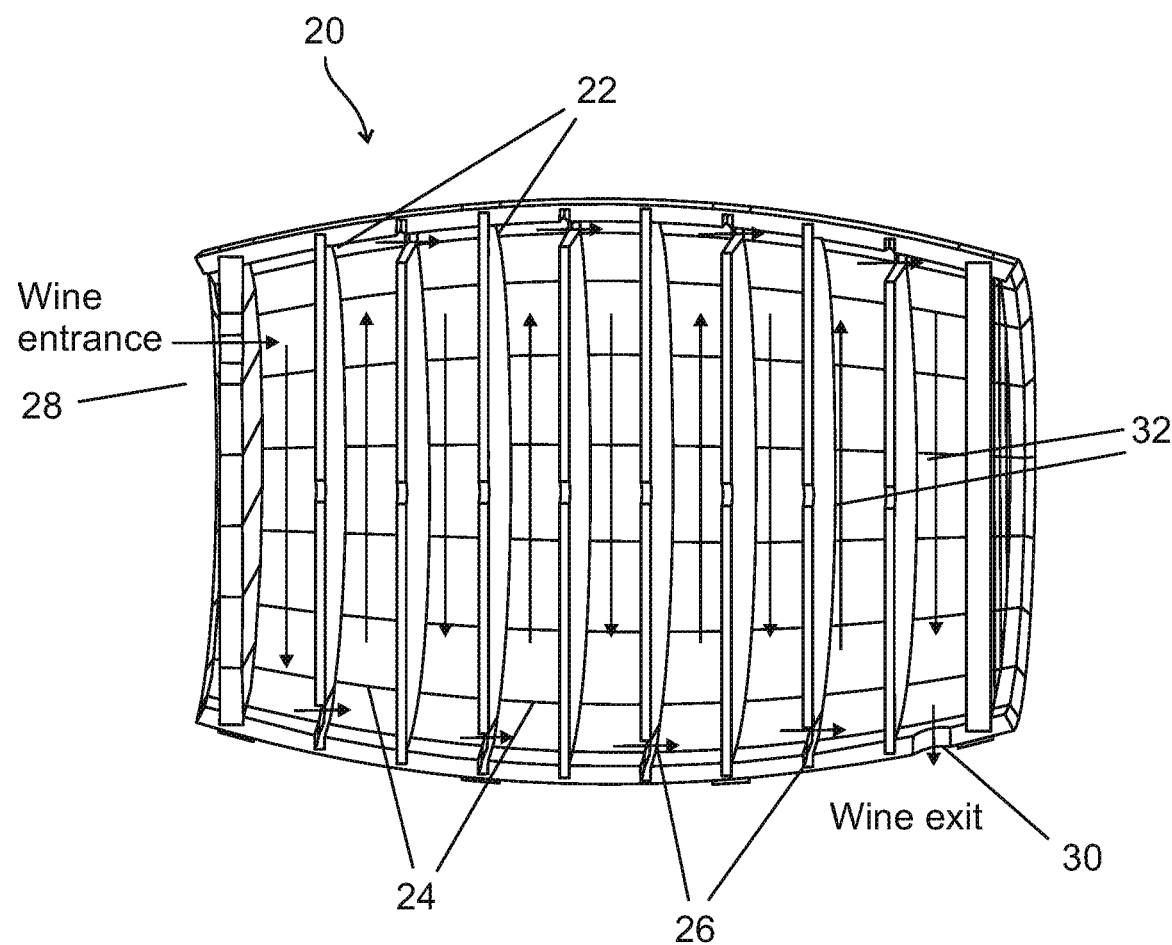
FIG. 2 is a cross-sectional view of one of the barrels of FIG. 1.

Reference is now made to FIG. 2 which shows a longitudinal cross section 20 of one of the barrels of FIG. 1. In the barrels of the present embodiments, internal dividers 22 are installed. The dividers are shape fitted to the barrel to thereby construct compartments 24. In the bottom or top of each compartment, the divider 22 contains a narrow passage or opening 26, which enables movement of the wine through the chambers. The openings 26 alternate between top and bottom to force the wine to flow along the length of each compartment.

Each barrel has an inlet 28 and an outlet 30, which may be controlled with valves. As shown in FIG. 1, the inlets and outlets are concealed from frontal view and this is to retain a traditional appearance at the winery. The inlets and the outlets may be flexibly connected together using piping, enabling the connection of several barrels in a row or in parallel in any desired configuration.

The dividers 22 add several times more surface area, at which extraction of oak flavors is able to occur. In addition, the movement of the wine through the barrel refreshes the wine in contact with the external surface, thus enhancing the micro oxidation process.

In addition, the slow but consistent flow of wine through the barrels may prevent much of the sedimentation that generally occurs in the barrels. Rather most of the sedimentation occurs in the tank, which may then be separated and removed through a specific sediment removing valve provided for this purpose and located at the bottom of the tank—see FIG. 4.

Figure 3:
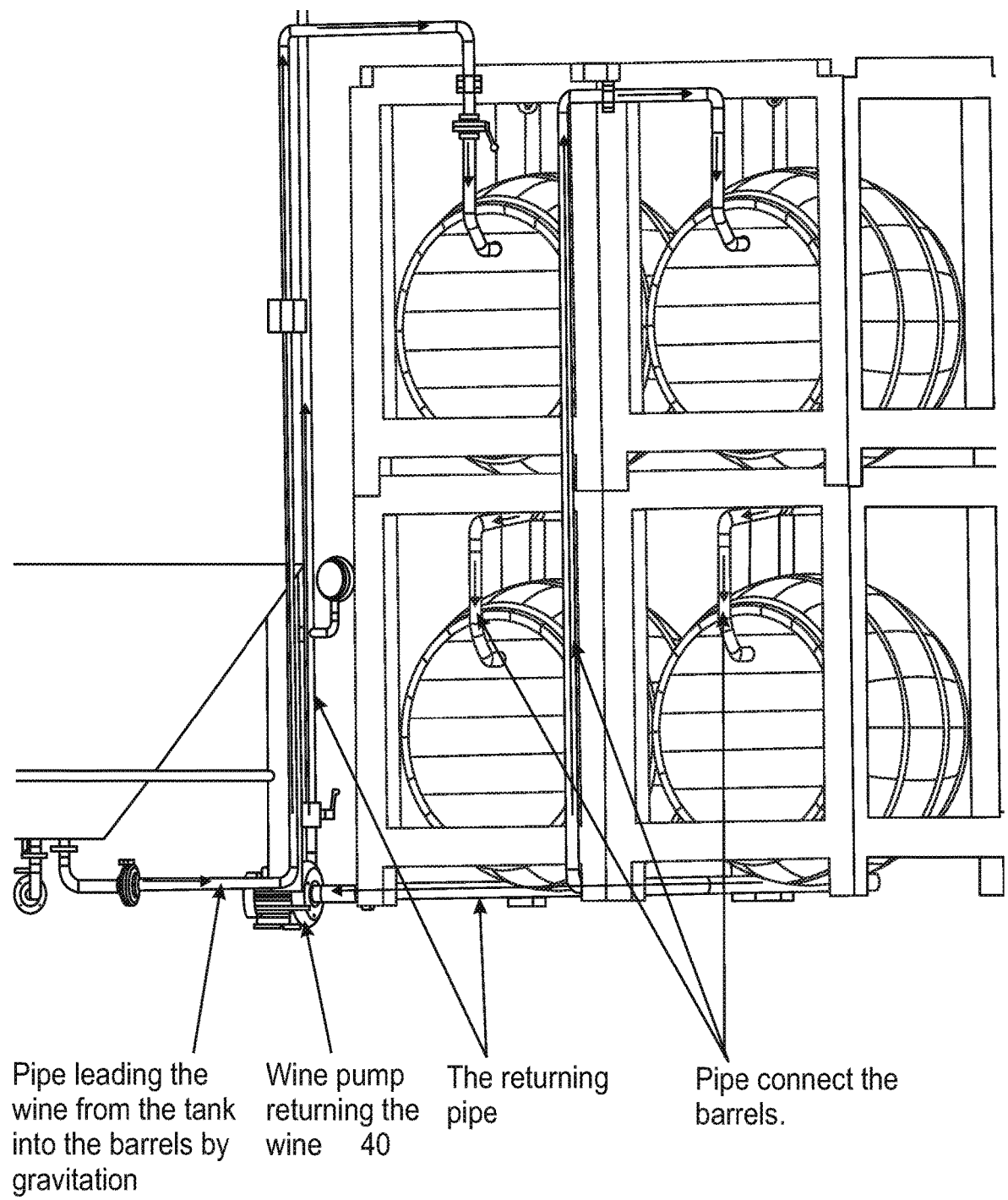
FIG. 3 is a schematic view of a way of connecting barrels for use in the system of FIG. 1.
Figure 4:
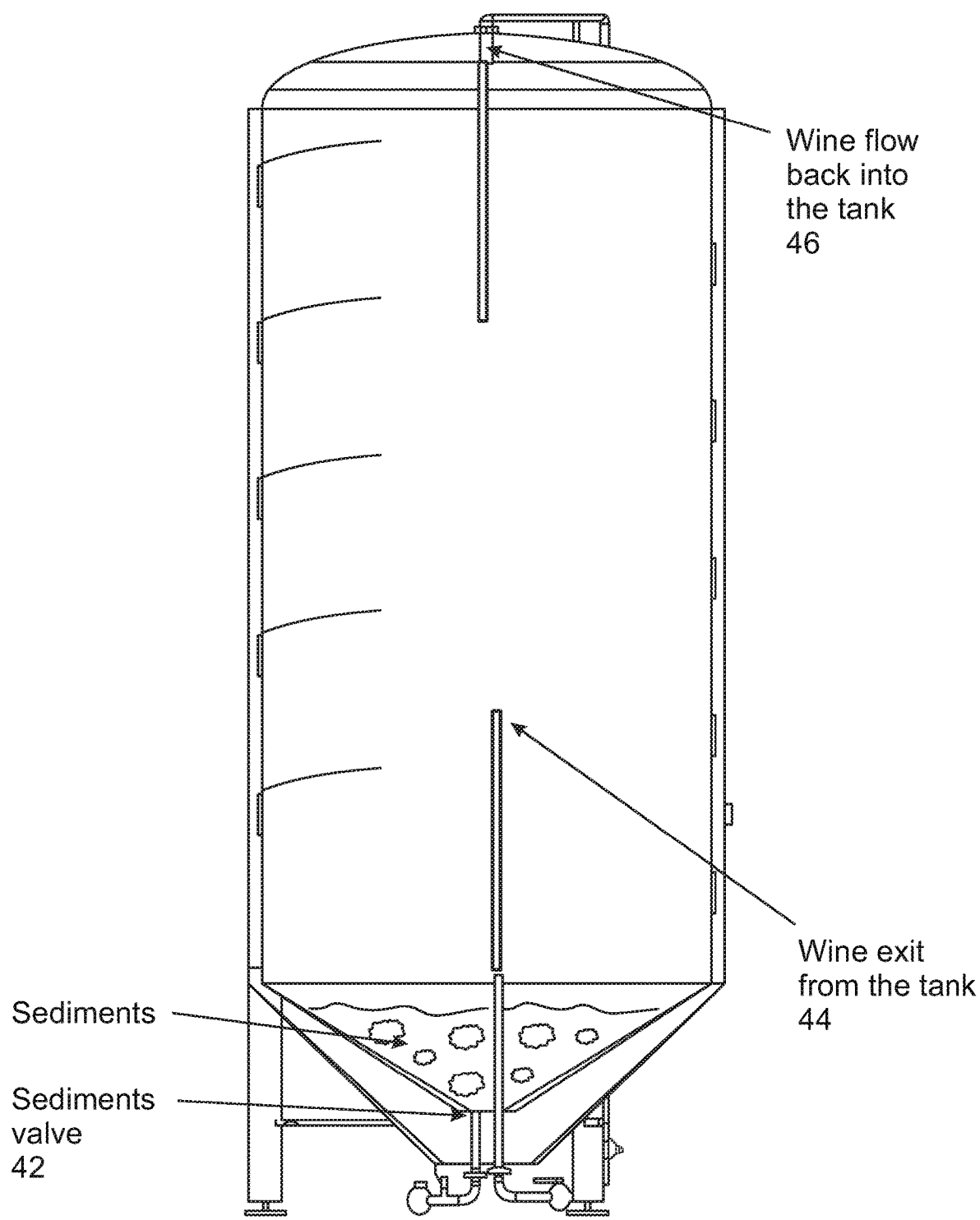
FIG. 4 is a cross-sectional view of the tank of FIG. 1.

The barrels may be made of the traditional oak. As shown, the barrel is placed on its side and the compartments and the openings form a flow path indicated by arrows 32 between intake 28 at one end of the barrel and outlet 30 at an opposite end of the barrel. Each compartment may have two openings, an inlet at one end and an outlet at an opposite end so that the flow path extends along a length of each compartment. Typically, the barrel inlet 28 is higher than the barrel outlet 30, thereby to allow gravity to assist with flow of the maturing wine through the flow path.
Description of the Pathway of Wine Through the System During Aging:

When ending malolactic fermentation, or whenever the winemaker decides to start the aging process, the wine is pumped into a stainless steel tank such as that shown in FIG. 4 to which reference is now made. The tank is the reservoir of the aging system, and is connected to a set of barrels of the kind shown in FIG. 2. In an embodiment, the wine in the tank may be kept constantly under a bed of Argon gas to prevent oxidation. The barrels may typically together consist of 15% of the tank volume. The barrels may be connected between themselves and back to the tank. As shown in FIG. 3, wine flows from the upper part of the lower third of the tank via wine outlet 44, by gravitation, into the upper barrel, then into the barrel underneath, back up into the second upper barrel and so on. The flow motion may be assisted by the constant emptying of the last barrel by low flow pump 40. The wine may thus circulate through the barrels in a very slow motion, flowing through the chambers in the barrels and back into the upper part of the tank via wine inlet 46. In this way, wine circulation in the tank itself is minimized, enabling the stabilization and natural sedimentation of organic and inorganic particles, and the clarification of the wine in the tank. The sediments gathered in the tank are removed periodically by the sedimentation valve 42.

It is expected that during the life of a patent maturing from this application many relevant wine aging techniques and equipment will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. System for maturation of wine comprising a tank, wine and at least one wooden barrel and flow connectors to allow circulation of maturing wine between said tank and said at least one barrel, wherein said wooden barrel comprises:
   a barrel inlet;
   a barrel outlet;
   internal wooden surfaces, said internal wooden surfaces located to obstruct flow between said barrel inlet and said barrel outlet, said internal wooden surfaces forming a succession of respectively closed-off compartments;
   openings in said internal wooden surfaces located between said respectively closed-off compartments, said openings being located at alternating ends of succeeding compartments respectively, thereby to define a zig-zag flow path, for the wine, from the barrel inlet, through lengths of said succeeding compartments respectively and to the barrel outlet, the flow path to limit said circulation of said maturing wine to pass through said each of said compartments and back to said tank.

2. The system of claim 1, wherein said tank is a steel tank.

3. The system of claim 1, wherein the at least one barrel is at a lower level than a top of said tank to allow gravity to assist said circulation.

4. The system of claim 1, wherein the flow connectors comprise a pump to assist said circulation.

5. The system of claim 1, comprising a plurality of barrels connected in series with each other and with said tank.

6. The system of claim 1, comprising a plurality of barrels connected in parallel with each other and in series with said tank.

7. A barrel for maturation of wine comprising a wooden exterior and an internal volume and a plurality of internal wooden surfaces extending inwardly of said wooden exterior into said internal volume, wherein said internal wooden surfaces divide said barrel into respectively closed-off compartments, said internal wooden surfaces having openings at alternating ends of successive respectively closed-off compartments to allow for flow of maturing wine to travel through each of said compartments in succession, the barrel being placed on its side and wherein said compartments and said openings form a zig-zag flow path between an intake at one end of said barrel and an outlet at an opposite end of said barrel, the flow path being via lengths of said succeeding compartments, said intake and said outlet configured for connecting to an external tank, thereby to limit circulation from said external tank to follow said compartments along said zig-zag flow path and back to said external tank, the barrel being connected to a tank via flow connectors, said flow connectors configured with said tank and said barrel such that wine flows from an upper part of a lower third of the tank via a wine outlet of said tank by gravitation, into the barrel, circulates through said barrel and returns to an upper part of the tank via a wine inlet of said tank.

8. The barrel of claim 7, comprising oak.

9. The barrel of claim 7, wherein said inlet is higher than said outlet, thereby to allow gravity to assist with flow of said maturing wine through said flow path.

10. A method of maturing wine comprising circulating maturing wine between at least one wooden barrel and a tank, the wooden barrel having internal walls forming respectively isolated compartments and openings between said compartments, the openings being at alternating ends of succeeding compartments to force said circulating wine into a zig-zag flow path through succeeding lengths of said compartments, said circulating comprising following said flow path through said compartments of said barrel and returning to said tank via flow connectors, said flow connectors configured with said tank and said barrel such that wine flows from an upper part of a lower third of the tank via a wine outlet of said tank by gravitation, into the barrel, circulates through said barrel and returns to an upper part of the tank via a wine inlet of said tank.

11. The method of claim 10, wherein circulation is sufficiently slow to allow sedimentation from said maturing wine within said tank.

* * * * *